(12) United States Patent
Takaori et al.

(10) Patent No.: US 11,479,741 B2
(45) Date of Patent: Oct. 25, 2022

(54) WASH FLUID FOR USE IN INKJET RECORDING APPARATUS AND IMAGE FORMATION METHOD

(71) Applicant: KYOCERA Document Solutions Inc., Osaka (JP)

(72) Inventors: Yasuko Takaori, Osaka (JP); Noriaki Ozawa, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 409 days.

(21) Appl. No.: 16/687,169

(22) Filed: Nov. 18, 2019

(65) Prior Publication Data

US 2020/0164651 A1 May 28, 2020

(30) Foreign Application Priority Data

Nov. 28, 2018 (JP) ............................. JP2018-222429

(51) Int. Cl.
| | | |
|---|---|---|
| *C11D 1/10* | (2006.01) | |
| *B41J 2/165* | (2006.01) | |
| *C09D 11/02* | (2014.01) | |
| *C09D 11/06* | (2006.01) | |

(52) U.S. Cl.
CPC ............ *C11D 1/10* (2013.01); *B41J 2/16535* (2013.01); *B41J 2/16552* (2013.01); *C09D 11/02* (2013.01); *C09D 11/06* (2013.01); *B41J 2002/16558* (2013.01)

(58) Field of Classification Search
CPC ..... C11D 1/10; B41J 2/16535; B41J 2/16552; C09D 11/06
See application file for complete search history.

(56) References Cited

U.S. PATENT DOCUMENTS

| | | |
|---|---|---|
| 2017/0275561 A1 | 9/2017 | Sato et al. |
| 2018/0147851 A1 | 5/2018 | Takaori et al. |
| 2019/0344569 A1* | 11/2019 | Sai .......................... B41J 2/165 |

FOREIGN PATENT DOCUMENTS

| | | |
|---|---|---|
| JP | 2009-155424 A | 7/2009 |
| JP | 2018-100341 A | 6/2018 |

OTHER PUBLICATIONS

An Office Action mailed by China National Intellectual Property Administration dated Oct. 25, 2021, which corresponds to Chinese Patent Application No. 201911152558.0 and is related to U.S. Appl. No. 16/687,169; with English language translation.

* cited by examiner

*Primary Examiner* — Michael M. Robinson
(74) *Attorney, Agent, or Firm* — Studebaker & Brackett PC (57) ABSTRACT

A wash fluid for use in an inkjet recording apparatus contains water, a coconut oil fatty acid surfactant, an organic deliquescent agent, a polyhydric alcohol, and a basic inorganic compound. The polyhydric alcohol is an alkanediol. The coconut oil fatty acid surfactant is contained in an amount of at least 0.01% by mass and no greater than 3.00% by mass. The organic deliquescent agent is contained in an amount of at least 0.10% by mass and no greater than 30.00% by mass.

7 Claims, 3 Drawing Sheets

WASH FLUID FOR USE IN INKJET RECORDING APPARATUS AND IMAGE FORMATION METHOD

INCORPORATION BY REFERENCE

The present application claims priority under 35 U.S.C. § 119 to Japanese Patent Application No. 2018-222429, filed on Nov. 28, 2018. The contents of this application are incorporated herein by reference in their entirety.

BACKGROUND

The present disclosure relates to a wash fluid for use in an inkjet recording apparatus and an image formation method.

A method has been known for washing an ejection surface of a recording head of an inkjet recording apparatus by using a wash fluid to remove agglomerate and the like attached to the ejection surface. An example of two-liquid wash fluids for inkjet head washing is a combination of an A liquid and a B liquid. The A liquid contains alkylamine oxide and water. The B liquid contains water and at least one selected from the group consisting of sodium polyoxyethylene alkyl ether sulfate and alkyl benzene sulfonate or a salt thereof.

SUMMARY

A wash fluid for use in an inkjet recording apparatus according to an aspect of the present disclosure contains water, a coconut oil fatty acid surfactant, an organic deliquescent agent, a polyhydric alcohol, and a basic inorganic compound. The polyhydric alcohol is an alkanediol. The coconut oil fatty acid surfactant is contained in an amount of at least 0.01% by mass and no greater than 3.00% by mass. The organic deliquescent agent is contained in an amount of at least 0.10% by mass and no greater than 30.00% by mass.

An image formation method according to an aspect of the present disclosure includes: ejecting an ink toward a recording medium from an ejection surface of a recording head; supplying a wash fluid to the ejection surface; discharging the ink from the ejection surface by pressure application; and wiping the ejection surface. The wash fluid is the above-described wash fluid for use in an inkjet recording apparatus.

DETAILED DESCRIPTION

The following describes embodiments of the present disclosure. Note that unless otherwise stated, evaluation results (for example, values indicating shape and physical properties) of a powder are number averages of values measured with respect to an appropriate number of particles of the powder. Measurement values for volume median diameter ($D_{50}$) of a powder are values measured using a laser diffraction particle size distribution measuring device ("ZETASIZER NANO ZS", product of Malvern Instruments Ltd.), unless otherwise stated.

In the present description, the term "-based" may be appended to the name of a chemical compound in order to form a generic name encompassing both the chemical compound itself and derivatives thereof. Also, when the term "-based" is appended to the name of a chemical compound used in the name of a polymer, the term indicates that a repeating unit of the polymer originates from the chemical compound or a derivative thereof. In the present description, the term "(meth)acryl" is used as a generic term for both acryl and methacryl.

First Embodiment: Wash Fluid for Use in Inkjet Recording Apparatus

A first embodiment of the present disclosure relates to a wash fluid for use in an inkjet recording apparatus (also referred to below simply as a "wash fluid"). The wash fluid according to the first embodiment contains water, a coconut oil fatty acid surfactant, an organic deliquescent agent, a polyhydric alcohol, and a basic inorganic compound. In the following description, the organic deliquescent agent contained in the wash fluid may be referred to as a "first organic deliquescent agent". The polyhydric alcohol is an alkanediol. The coconut oil fatty acid surfactant is contained in the wash fluid in an amount of at least 0.01% by mass and no greater than 3.00% by mass. The first organic deliquescent agent is contained in the wash fluid in an amount of at least 0.10% by mass and no greater than 30.00% by mass.

As a result of the wash fluid according to the first embodiment being used, an ink dried on and adhering to an ejection surface of a recording head (also referred to below as "adhering ink") can be favorably removed from the ejection surface. In order to aid understanding, an image formation method using an inkjet recording apparatus and a formation process of adhering ink will be described prior to detailed description of the wash fluid according to the first embodiment.

The following describes an example of the image formation method using an inkjet recording apparatus. The inkjet recording apparatus used in the image formation method includes a recording head. The recording head has an ejection surface. A water-repellent film and a plurality of discharge ports are provided on the ejection surface. In an example of the image formation method, a water-based ink (also referred to below simply as an "ink") is first ejected toward a recording medium from the ejection surface of the recording head. Next, supply of the wash fluid to the ejection surface and a purging operation are performed. The "purging operation" herein means an operation to discharge the ink from the discharge ports in the ejection surface by pressure application to the ink. In the following, ink discharged in the purging operation may be referred to as "purging ink". Subsequently, a wiping operation is performed. The "wiping operation" herein means an operation to wipe the ejection surface. The supply of the wash fluid to the ejection surface and the purging operation are performed after the ink ejection toward the recording medium from the ejection surface and before the wiping operation. The supply of the wash fluid to the ejection surface may be performed before the purging operation, after the purging operation, or simultaneously with the purging operation.

The following describes a formation process of adhering ink. Note that the formation process described below is an example of inferences and the formation process in the present disclosure is not limited to the following formation process. The ink contains for example an aqueous solvent and pigment particles. The pigment particles each include for example a pigment core containing a pigment and a coating resin disposed on a surface of the pigment core. A resin salt is often used as the coating resin. The resin salt has, in molecules thereof, a functional group capable of being electrolytic dissociated (for example, a COONa group). When the ink as above is ejected from the ejection surface of the recording head toward a recording medium, the ink may be attached to the ejection surface. Once the ink is attached to the ejection surface, the ink is in contact with air to be dried. In a state in which the ink is not yet dried, the ink contains a sufficient amount of the aqueous solvent. For the reason as above, electrolytic dissociation (for example, formation of a $COO^-$ group) tends to occur on the surface of the coating resin to cause electrical repulsion between the pigment particles. Thus, the pigment particles hardly agglomerate. However, once the ink is dried, the amount of the aqueous solvent in the ink decreases, and therefore, electrolytic dissociation (for example, formation of a $COO^-$ group) hardly occurs on the surface of the coating resin. Thus, electric repulsion of the pigment particles hardly occurs with a result that the pigment particles tends to agglomerate. Once the pigment particles agglomerate together, pieces of the coating resin included in the pigment particles come in contact with one another to tend to form a film constituted by the coating resin (also referred to below as a "resin film"). Then, agglomerate of the pigment cores of the pigment particles and the resin film coating the agglomerate are formed. Thus, adhering ink is formed. The image formation method using an inkjet recording apparatus and the formation process of adhering ink have been described so far.

When the wash fluid according to the first embodiment is supplied to the ejection surface and the purging operation and the wiping operation are performed, adhering ink formed by the formation process as described above can be removed from the ejection surface. Thus, the ejection surface of the recording head is favorably washed. Furthermore, a situation in which adhering ink blocks the discharge ports can be inhibited and impairment of ink ejection performance can also be inhibited. Examples of phenomena showing impairment of ejection performance include ink being hardly ejected and ink being ejected in a direction different from a desired ejection direction. Moreover, as a result of the wash fluid according to the first embodiment being supplied to the ejection surface, a situation in which a member of the inkjet recording apparatus comes in contact with the ejection surface to shave the water-repellent film of the ejection surface of the recording head can be inhibited. As a result of shaving on the water-repellent film being inhibited, ink adhesion to the ejection surface can be inhibited for a long period of time. As such, stable washing effect can be exhibited for a long period of time with use of the wash fluid according to the first embodiment. The reason why the wash fluid according to the first embodiment can provide the advantages as descried above will be described later in "First to Sixth Advantages".

The following describes the coconut oil fatty acid surfactant, the first organic deliquescent agent, the polyhydric alcohol, and the basic inorganic compound that are contained in the wash fluid according to the first embodiment. Additional components that may be contained in the wash fluid as necessary (components other than the coconut oil fatty acid surfactant, the first organic deliquescent agent, the polyhydric alcohol, and the basic inorganic compound) will be described in addition. Viscosity, surface tension, and pH of the wash fluid and a wash fluid production method will be also described.

(Coconut Oil Fatty Acid Surfactant)

The coconut oil fatty acid surfactant is a surfactant prepared from a fatty acid derived from a coconut oil. As a result of the wash fluid containing the coconut oil fatty acid surfactant, the following first and second advantages can be obtained.

The first advantage will be described. A coconut oil fatty acid surfactant has a relatively high molecular weight. Therefore, when a wash fluid containing the coconut oil fatty acid surfactant is supplied to the ejection surface, the coconut oil fatty acid surfactant functions as a lubricant. For the reason as above, even when a member for supplying the wash fluid to the ejection surface (for example, sponge) or a member used in the wiping operation (for example, a blade) comes in contact with the ejection surface, friction force generated between the member and the ejection surface can be decreased to inhibit shaving on the water-repellent film of the ejection surface.

The second advantage will be described. As described above in "Formation Process of Adhering Ink", a resin film constitutes the surface of adhering ink. The resin film is formed from a coating resin, for which a resin salt is often used. Therefore, when adhering ink comes in contact with a wash fluid containing water, electrolytic dissociation (for example, formation of a $COO^-$ group) occurs on the surface of the adhering ink, resulting in the surface of the adhering ink tending to exhibit hydrophilicity. By contrast, the ejection surface typically tends to exhibit hydrophobicity. Therefore, when the wash fluid is supplied to the ejection surface, a hydrophilic group of the coconut oil fatty acid surfactant contained in the wash fluid exhibits affinity (hydrophilic interaction) toward the surface of the adhering ink. By contrast, a hydrophobic group of the coconut oil fatty acid surfactant exhibits affinity (hydrophobic interaction) toward the ejection surface. For the above interactions, the coconut oil fatty acid surfactant can stably stay between the adhering ink and the ejection surface. Therefore, when the wash fluid containing the coconut oil fatty acid surfactant is supplied to the ejection surface, the wash fluid enters between the adhering ink and the ejection surface from the surface of the adhering ink. As a result of the ejection surface being washed with the wash fluid entering therebetween, the ejection surface of the recording head can be favorably washed and impairment of ink ejection performance can be inhibited.

The coconut oil fatty acid surfactant may be any of a zwitterionic surfactant, an anionic surfactant, a cationic surfactant, and nonionic surfactant. Because the coconut oil fatty acid surfactant favorably functions as a lubricant and the water repellency of the ejection surface tends to be maintained, the coconut oil fatty acid surfactant is preferably a zwitterionic surfactant, an anionic surfactant, or a nonionic surfactant, and more preferably a zwitterionic surfactant. Note that the zwitterionic surfactant exhibits a property of a cationic surfactant in an acidic liquid and exhibits a property of an anionic surfactant in a basic liquid. The ink is typically weakly basic. Therefore, in a case where the coconut oil fatty acid surfactant is a zwitterionic surfactant, the zwitterionic surfactant tends to exhibit a property of an anionic surfactant upon the wash fluid coming into contact with adhering ink.

In order to favorably wash the ejection surface, inhibit impairment of ink ejection performance, and inhibit shaving on the water-repellent film of the ejection surface, the coconut oil fatty acid surfactant preferably includes at least one of coconut oil fatty acid amidopropyl betaine, coconut oil fatty acid methyl taurine sodium, N-coconut oil fatty acid acyl-L-glutamic acid triethanolamine, and coconut oil fatty acid diethanolamide. The coconut oil fatty acid surfactant further preferably includes at least one of coconut oil fatty acid amidopropyl betaine, coconut oil fatty acid methyl taurine sodium, and N-coconut oil fatty acid acyl-L-glutamic acid triethanolamine. For example, the coconut oil fatty acid surfactant may include only one of coconut oil fatty acid amidopropyl betaine, coconut oil fatty acid methyl taurine sodium, and N-coconut oil fatty acid acyl-L-glutamic acid triethanolamine.

The coconut oil fatty acid surfactant is contained in the wash fluid in an amount of at least 0.01% by mass and no greater than 3.00% by mass. When the coconut oil fatty acid surfactant is contained in the wash fluid in an amount of at least 0.01% by mass, a sufficient amount of the coconut oil fatty acid surfactant functioning also as a lubricant can be ensured and the water-repellent film of the ejection surface can be inhibited from being shaved. When the coconut oil fatty acid surfactant is contained in the wash fluid in an amount of no greater than 3.00% by mass, dispersibility of the coconut oil fatty acid surfactant in the wash fluid can be ensured and it is possible to increase washability on the ejection surface and inhibit impairment of ink ejection performance. In order to further inhibit shaving on the water-repellent film of the ejection surface, the coconut oil fatty acid surfactant is preferably contained in the wash fluid in an amount of at least 0.50% by mass and no greater than 3.00% by mass.

(First Organic Deliquescent Agent)

The first organic deliquescent agent is a deliquescent organic compound. As a result of the wash fluid containing the first organic deliquescent agent, the following third and fourth advantages can be obtained. The third advantage will be described. When the wash fluid is supplied to the ejection surface and the purging operation is performed, purging ink containing the aqueous solvent is absorbed into the first organic deliquescent agent. As described above in "Second Advantage", the wash fluid enters between the adhering ink and the ejection surface from the surface of the adhering ink. Accordingly, the purging ink absorbed in the first organic deliquescent agent in the wash fluid also enters between the adhering ink and the ejection surface from the surface of the adhering ink. As a result of an increase in amount of the purging ink entering between the adhering ink and the ejection surface, not only ink directly after attachment to the ejection surface but also adhering ink resulting from an elapse of time from attachment to the ejection surface can be removed from the ejection surface. Therefore, the ejection surface of the recording head can be favorably washed to inhibit impairment of ink ejection performance.

The fourth advantage will be described. In a case where there is wash fluid left unwiped after the wiping operation, the wash fluid left unwiped also contains the first organic deliquescent agent. Therefore, the first organic deliquescent agent contained in the wash fluid left unwiped absorbs moisture in the air to be liquefied when an uncapping operation is performed. When the wash fluid left unwiped is liquefied, the wash fluid left unwiped can be removed by preparatory wiping. The uncapping operation and the preparatory wiping will be described later in a second embodiment.

Examples of the first organic deliquescent agent include sorbitol, trimethylolpropane, and 1,3-bis(2-hydroxyethyl)-5, 5-dimethylimidazolidine-2,4-dione. The wash fluid may contain only one first organic deliquescent agent or two or more first organic deliquescent agents.

The first organic deliquescent agent is preferably 1,3-bis (2-hydroxyethyl)-5,5-dimethylimidazolidine-2,4-dione. In the following description, 1,3-bis(2-hydroxyethyl)-5,5-dimethylimidazolidine-2,4-dione may be referred to as an "organic deliquescent agent A".

As a result of the first organic deliquescent agent including the organic deliquescent agent A, the following advantage can be obtained. Once adhering ink comes in contact with a wash fluid containing water, electrolytic dissociation (for example, formation of a $COO^-$ group) tends to occur on the surface of the adhering ink. The organic deliquescent agent A has no charge. Therefore, electrical attraction is hardly generated between the organic deliquescent agent A and the surface of the adhering ink. The organic deliquescent agent A is accordingly difficult to stay on the surface of the adhering ink and tends to enter between the adhering ink and the ejection surface. Accordingly, the organic deliquescent agent A having absorbed the purging ink favorably enters between the adhering ink and the ejection surface to positively wash the ejection surface of the recording head, thereby inhibiting impairment of ink ejection performance.

As a result of the first organic deliquescent agent including the organic deliquescent agent A, the following advantage can also be obtained. The organic deliquescent agent A has relatively low viscosity. Therefore, the viscosity of the wash fluid is inhibited from being excessively high and accordingly the wash fluid enters between the adhering ink and the ejection surface favorably. Accordingly, the organic deliquescent agent A having absorbed the purging ink favorably enters between the adhering ink and the ejection surface to positively wash the ejection surface of the recording head, thereby inhibiting impairment of ink ejection performance.

As a result of the first organic deliquescent agent including the organic deliquescent agent A, the following advantage can also be obtained. The organic deliquescent agent A has relatively low viscosity. Therefore, the wiping operation or the preparatory wiping can easily wipe off the organic deliquescent agent A, and accordingly, the organic deliquescent agent A hardly remains on the ejection surface.

The first organic deliquescent agent is contained in the wash fluid in an amount of at least 0.10% by mass and no greater than 30.00% by mass. As a result of the first organic deliquescent agent being contained in the wash fluid in an amount of at least 0.10% by mass, a sufficient amount of purging ink to be absorbed in the first organic deliquescent agent can be ensured and a sufficient amount of purging ink to enter between the adhering ink and the ejection surface can be also ensured. Therefore, the ejection surface of the recording head can be favorably washed, thereby inhibiting impairment of ink ejection performance. As a result of the first organic deliquescent agent being contained in the wash fluid in an amount of no greater than 30.00% by mass, the viscosity of the wash fluid can be not inhibited form being excessively high, thereby achieving uniform application of the wash fluid onto the ejection surface. Furthermore, as a result of the first organic deliquescent agent being contained in the wash fluid in an amount of no greater than 30.00% by mass, precipitation of the first organic deliquescent agent in the wash fluid can be inhibited, thereby inhibiting impairment of ink ejection performance. In order to favorably wash the ejection surface of the recording head, the first organic deliquescent agent is preferably contained in the wash fluid in an amount of at least 0.50% by mass and no greater than 30.00% by mass. Note that in a case where the wash fluid contains two or more first organic deliquescent agents, the amount of the first organic deliquescent agent in the wash fluid is a total amount of the two or more first organic deliquescent agents.

(Polyhydric Alcohol)

The polyhydric alcohol is an alkanediol. An alkanediol is a straight chain or branched chain alkane substituted with two hydroxy groups. As a result of the wash fluid containing an alkanediol, which is a polyhydric alcohol, the following fifth advantage can be obtained. The fifth advantage will be described. As a result of the wash fluid containing an alkanediol, which is a polyhydric alcohol, impairment of ink ejection performance can be inhibited. Furthermore, as a result of the wash fluid containing an alkanediol as the polyhydric alcohol, the water-repellent film of the ejection surface of the recording head can be inhibited from being shaved.

Examples of the alkanediol, which is a polyhydric alcohol include alkanediols having a carbon number of at least 1 and no greater than 6. Examples of alkanediols having a carbon number of at least 1 and no greater than 6 include 1,3-propanediol, 1,3-butanediol, 1,2-pentanediol, 1,5-pentanediol, and 1,2-hexanediol. The wash fluid may contain only one polyhydric alcohol or two or more polyhydric alcohols.

The alkanediol that is the polyhydric alcohol is preferably an alkanediol having a carbon number of at least 1 and no greater than 6, more preferably an alkanediol having a carbon number of at least 1 and no greater than 5, further preferably an alkanediol having a carbon number of at least 1 and no greater than 4, and particularly preferably 1,3-propanediol.

The polyhydric alcohol is contained in the wash fluid preferably in an amount of at least 0.50% by mass and no greater than 5.00% by mass, and more preferably in an amount of at least 1.00% by mass and no greater than 3.00% by mass.

(Basic Inorganic Compound)

As a result of the wash fluid containing the basic inorganic compound, the following sixth advantage can be obtained. The coconut oil fatty acid surfactant may be any of a zwitterionic surfactant, an anionic surfactant, a cationic surfactant, and a nonionic surfactant as has been described above. Therefore, the pH of the wash fluid containing the coconut oil fatty acid surfactant may decrease. When the pH of the wash fluid is increased by containing the basic inorganic compound in the wash fluid, the wash fluid can have excellent component dispersibility.

The basic inorganic compound preferably includes at least one of sodium hydroxide and potassium hydroxide. The basic inorganic compound may include only one of them. For example, the basic inorganic compound may include sodium hydroxide or include only sodium hydroxide.

The basic inorganic compound is contained in the wash fluid preferably in an amount of at least 0.0001 mol/L and no greater than 0.015 mol/L, and more preferably in an amount of at least 0.001 mol/L, and no greater than 0.003 mol/L. The amount of the basic inorganic compound in the wash fluid is preferably such an amount that allows the wash fluid to have a pH of at least 7.5 and no greater than 9.0, and more preferably such an amount that allows the wash fluid to have a pH of at least 7.5 and no greater than 7.8.

(Additional Components)

The wash fluid may contain a solution stabilizer as necessary. As a result of the wash fluid containing the solution stabilizer, components contained in the wash fluid tend to be compatible, thereby achieving a stable solution state of the wash fluid. The solution stabilizer preferably includes at least one of 2-pyrrolidone, N-methyl-2-pyrrolidone, and γ-butyrolactone. The solution stabilizer may include only one of them. For example, the solution stabilizer may include 2-pyrrolidone or include only 2-pyrrolidone. The solution stabilizer is contained in the wash fluid preferably in an amount of at least 0.50% by mass and no greater than 20.00% by mass, and more preferably in an amount of at least 0.50% by mass and no greater than 10.00% by mass.

The wash fluid may contain a penetrating agent as necessary. The penetrating agent preferably includes at least one of 1,2-octanediol, 2,4-diethyl-1,5-pentanediol, 2-butyl-2-ethyl-1,3-propanediol, triethylene glycol monobutyl ether, and diethylene glycol monobutyl ether. The penetrating agent may include only one of them. For example, the penetrating agent may include triethylene glycol monobutyl ether or include only triethylene glycol monobutyl ether. The penetrating agent is contained in the wash fluid preferably in an amount of at least 0.50% by mass and no greater than 20.00% by mass.

(Viscosity, Surface Tension, and pH of Wash Fluid)

The viscosity at 25° C. of the wash fluid is preferably at least 5.5 mPa·s and no greater than 7.5 mPa·s, and more preferably at least 5.5 mPa·s and less than 6.0 mPa·s. As a result of the viscosity at 25° C. of the wash fluid falling in the above range, uniform application of the wash fluid onto the ejection surface can be achieved. The surface tension of the wash fluid is preferably at least 32 mN/m and no greater than 35 mN/m. The wash fluid preferably has a pH of at least 7.5 and no greater than 9.0, and more preferably has a pH of at least 7.5 and no greater than 7.8.

Note that the wash fluid according to the first embodiment is a water-based wash fluid containing water. The wash fluid according to the first embodiment preferably contains no organic solvent. The wash fluid according to the first embodiment is used for washing the ejection surface of the recording head included in the inkjet recording apparatus as has been described above. The wash fluid according to the first embodiment can be used not only for washing the ejection surface but also for washing a blade of the inkjet recording apparatus used in the wiping operation. The wash fluid according to the first embodiment can be used not only for washing the ejection surface but also for washing conveyance rollers included in the inkjet recording apparatus.

(Wash Fluid Production Method)

An example of wash fluid production methods includes a process of mixing materials (for example, water, the coconut oil fatty acid surfactant, the first organic deliquescent agent, the polyhydric alcohol, and the basic inorganic compound) together at respective specific blending amounts. Preferably, the materials are mixed together using a stirrer (for example, "THREE-ONE MOTOR BL-600", product of Shinto Scientific Co., Ltd.).

Second Embodiment: Image Formation Method

The second embodiment of the present disclosure relates to an image formation method. The image formation method according to the second embodiment uses the wash fluid according to the first embodiment. Therefore, improvement in washability on the ejection surface of the recording head, inhibition of impairment of ink ejection performance, and inhibition of shaving on the water-repellent film of the ejection surface of the recording head can be achieved according to the image formation method according to the second embodiment for the same reasons as those described in the first embodiment.

The image formation method according to the second embodiment includes for example an ejecting process, a supplying process, a purging process, and a wiping process. In the ejecting process, an ink is ejected toward a recording medium from an ejection surface of a recording head. In the supplying process, the wash fluid is supplied to the ejection surface. In the purging process, the purging operation is performed. Specifically, ink (purging ink) is discharged from the ejection surface by pressure application. In the wiping process, the wiping operation is performed. Specifically, the ejection surface is wiped. The supplying process and the purging process are each performed after the ejecting process and before the wiping process. The supplying process may be performed before or after the purging process or simultaneously with the purging process. The image formation method according to the second embodiment can be implemented using an inkjet recording apparatus loaded with an ink and the wash fluid according to the first embodiment.

Figure 1:
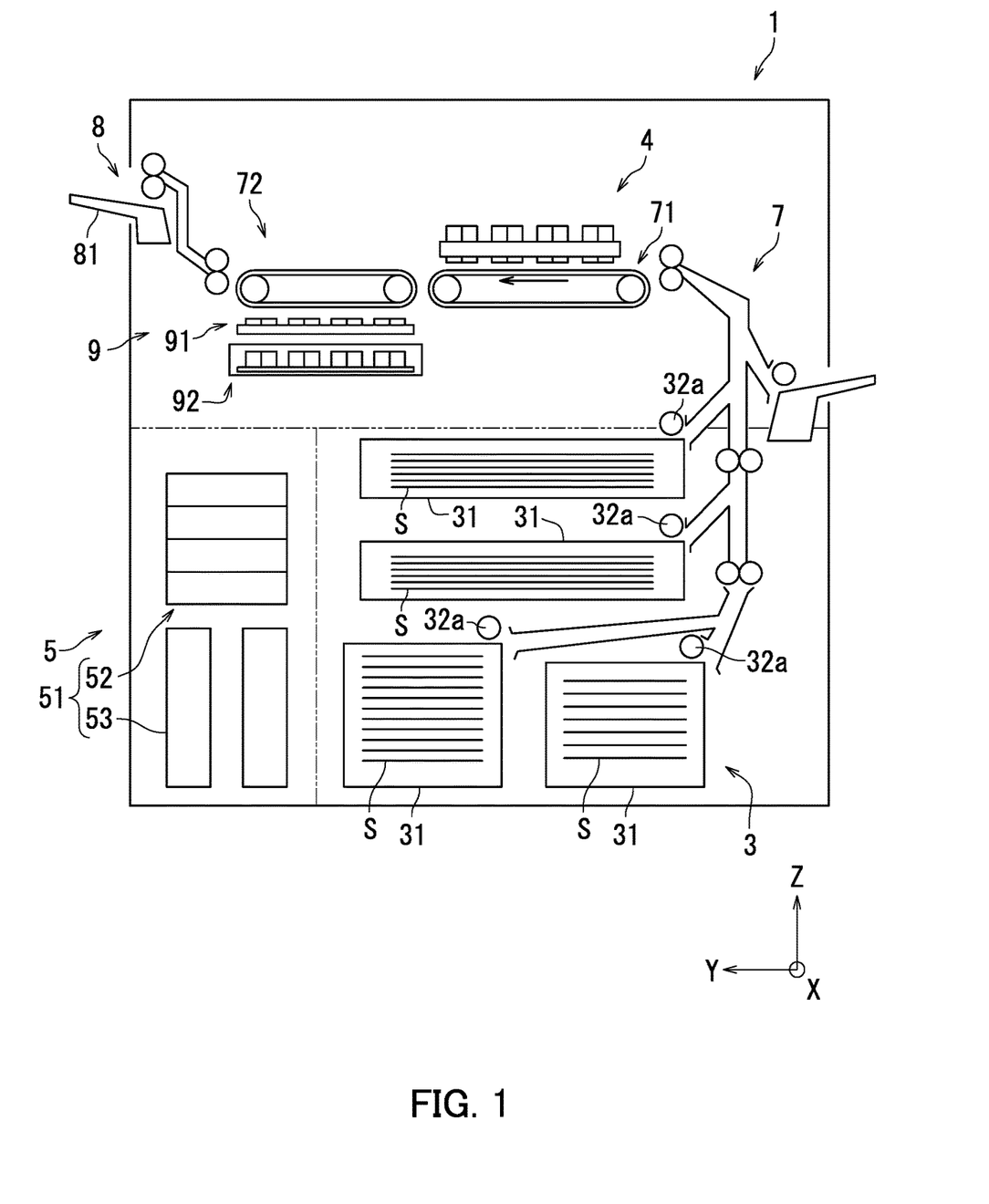
FIG. 1 is a diagram illustrating an example of a configuration of an image forming apparatus used in an image formation method according to a second embodiment of the present disclosure.
Figure 2:
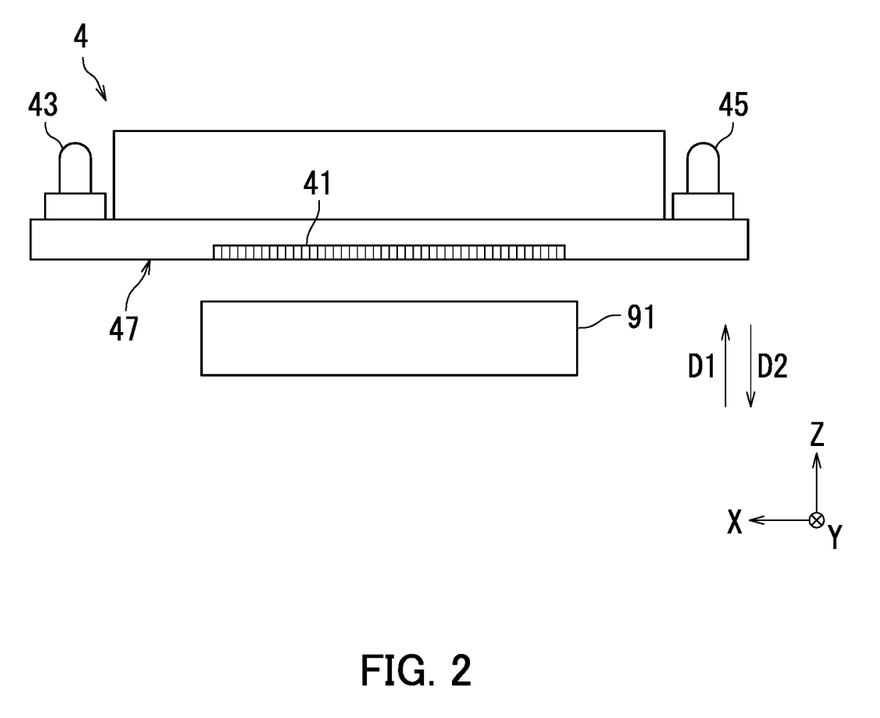
FIG. 2 is a diagram explaining the image formation method according to the second embodiment of the present disclosure.
Figure 3:
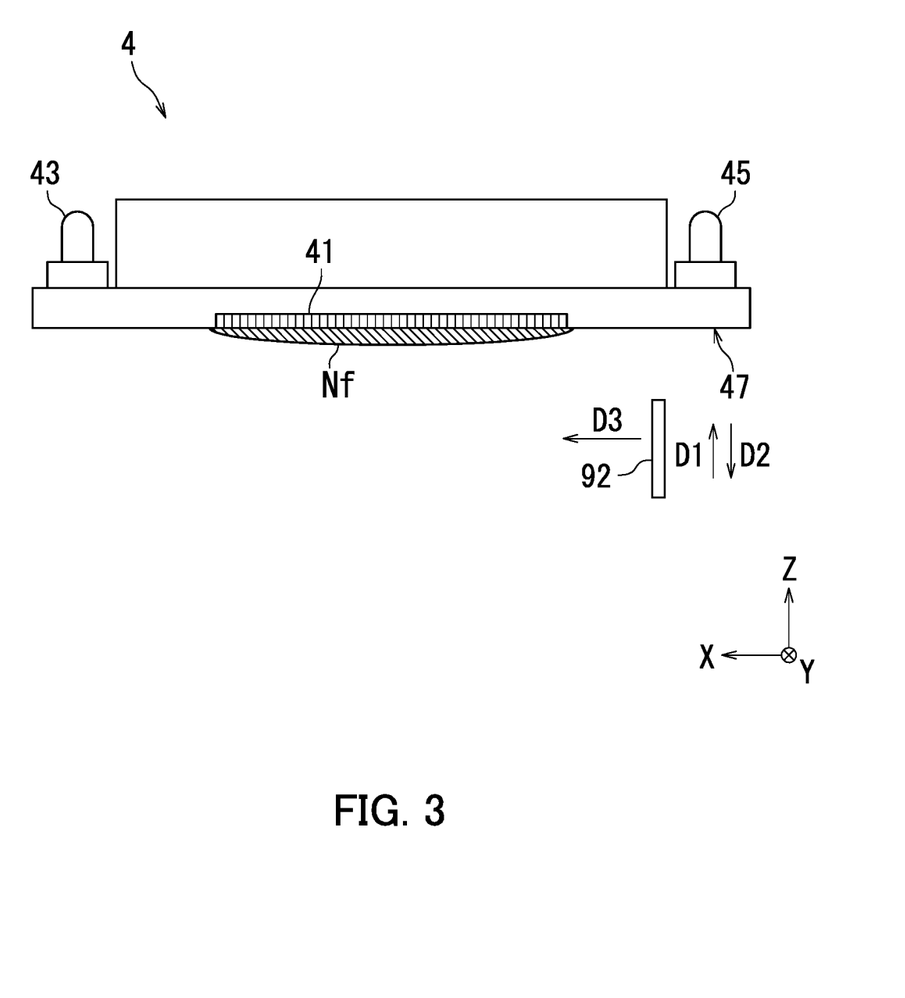
FIG. 3 is diagram explaining the image formation method according to the second embodiment of the present disclosure.

The following specifically describes an example of the image formation method according to the second embodiment with reference to FIGS. 1 to 3. FIG. 1 is a diagram illustrating a configuration of an image forming apparatus 1 used in the image formation method according to the second embodiment. FIGS. 2 and 3 each are a diagram explaining the image formation method according to the second embodiment. More specifically, FIG. 2 is a diagram explaining the supplying process. FIG. 3 is a diagram explaining the purging operation and the wiping operation. Here, an X axis, a Y axis, and a Z axis in each of FIGS. 1 to 3 are orthogonal to one another. FIGS. 2 and 3 each are a view of a main part of the image forming apparatus 1 in FIG. 1 as viewed from a side.

The configuration of the image forming apparatus 1 illustrated in FIG. 1 is described first. The image forming apparatus 1 illustrated in FIG. 1 includes a sheet feed section 3, a recording head 4, a liquid container 5, a sheet conveyance section 7, an ejection section 8, and a maintenance unit 9.

The sheet feed section 3 includes a plurality of sheet feed cassettes 31 and a plurality of sheet feed rollers 32a. A plurality of sheets of a recording medium S (for example, copy paper) are accommodated in each of the sheet feed cassettes 31 in a stacked manner.

The recording head 4 is provided with nozzles 41, an ink inlet 43, and an ink outlet 45 as illustrated in FIGS. 2 and 3. The recording head 4 has an ejection surface 47. The nozzles 41 are open in the ejection surface 47, and eject the ink toward the recording medium S (see FIG. 1). The recording head 4 is for example a line type recording head. The ink is contained in a second tank 52 (see FIG. 1). The ink flows into the recording head 4 from the second tank 52 through the ink inlet 43 and flows out of the recording head 4 through the ink outlet 45.

The liquid container 5 is provided with a cartridge 51 as illustrated in FIG. 1. The cartridge 51 is attached to the image forming apparatus 1 in a freely detachable manner. The cartridge 51 includes a first tank 53 and the second tank 52. The first tank 53 contains the wash fluid according to the first embodiment. The second tank 52 contains the ink.

The sheet conveyance section 7 includes a first conveyance unit 71 and a second conveyance unit 72. The ejection section 8 includes an exit tray 81.

The maintenance unit 9 includes sponge 91 and a blade 92. The sponge 91 and the blade 92 each are movable between a position opposite to the ejection surface 47 (see FIGS. 2 and 3) and a position opposite to the second conveyance unit 72 (see FIG. 1). The sponge 91 is movable in both an ascending direction D1 and a descending direction D2 as illustrated in FIG. 2. The sponge 91 is permeated with the wash fluid. The wash fluid is contained in the first tank 53 (see FIG. 1) and is supplied from the first tank 53 to the sponge 91. The blade 92 is movable in each of the ascending direction D1, the descending direction D2, and a wiping direction D3 as illustrated in FIG. 3. The "ascending direction D1" herein refers to a direction toward the ejection surface 47 in parallel to a Z-axis direction. The "descending direction D2" refers to a direction away from the ejection surface 47 in parallel to the Z-axis direction. The "wiping direction D3" refers to a direction along the ejection surface 47.

In order to form an image on a recording medium S using the image forming apparatus 1 illustrated in FIG. 1, one of the sheet feed rollers 32a first picks up the recording medium S accommodated in a corresponding one of the sheet feed cassettes 31 a sheet at a time from the topmost sheet of the recording medium S, and feeds the picked recording medium S to the first conveyance unit 71. When the recording medium S reaches the position facing the ejection surface 47 (see FIG. 2), the ink is ejected from the ejection surface 47 (specifically, the openings of the nozzles 41) toward the recording medium S (the ejecting process). Note that in a case where the recording medium S has A4 size and a longitudinal direction of the recording medium S is parallel to a conveyance direction of the recording medium S, the conveyance speed of the recording medium S by the first conveyance unit 71 is preferably at least 100 sheets/minute. Thereafter, the recording medium S is forwarded to the second conveyance unit 72 and then ejected out onto the exit tray 81.

In the ejecting process, the ink may be attached to the ejection surface 47. When the ink is attached to the ejection surface 47, adhering ink (not illustrated) is formed as a result of contact of the ink with air. In order to address the above, the supplying process, the purging process, and the wiping process are performed after the ejecting process.

The following describes the supplying process with reference to FIG. 2. In the supplying process, the sponge 91 is first impregnated with the wash fluid. Next, the sponge 91 is moved to the position facing the ejection surface 47 (position illustrated in FIG. 2), and then moved in the ascending direction D1 to be pressed against the ejection surface 47. In this manner, the wash fluid penetrating in the sponge 91 is supplied to the ejection surface 47. In so doing, a state in which the sponge 91 is pressed against the ejection surface 47 (also referred to below as a "state of the sponge 91 being pressed") is maintained preferably for a specific time period. The specific time period is preferably equal to or longer than 1 second and equal to or shorter than 5 minutes, and more preferably equal to or longer than 1 second and equal to or shorter than 30 seconds. A series of an operation to move the sponge 91 in the ascending direction D1, maintenance of the state of the sponge 91 being pressed, and an operation to move the sponge 91 in the descending direction D2 may be repeated. Furthermore, the sponge 91 may be moved in a direction along the ejection surface 47 (a direction parallel to the X-axis direction in FIG. 2) while the state of the sponge 91 being pressed is maintained.

When the specific time period has elapsed, the sponge 91 is moved in the descending direction D2 to release the state of the sponge 91 being pressed. Thus, the supplying process ends.

The following describes the purging process with reference to FIG. 3. In the purging process, the purging operation is performed. In the purging operation, the recording head 4 performs the purging process. Pressure application to the ink in the purging process forcedly discharges purging ink Nf from the ejection surface 47 (specifically, the openings of the nozzles 41). After the supplying process and the purging process, the wiping process is performed.

The following describes the wiping process with reference to FIG. 3. In the wiping process, the wiping operation is performed. In the wiping operation, the blade 92 is moved to the position opposite to the ejection surface 47 (position illustrated in FIG. 3), and then moved in the ascending direction D1 to be pressed against the ejection surface 47. Then, the blade 92 is moved in the direction along the ejection surface 47 (the wiping direction D3 in FIG. 3) while a state in which the blade 92 is pressed against the ejection surface 47 is maintained. Through the above, the ejection surface 47 is wiped by the blade 92 and adhering ink is accordingly removed.

In a case where the ink is not ejected for a long period of time, a capping operation is performed after the wiping process. The "capping operation" is an operation to seal the discharge ports. The capping operation seals the discharge ports to inhibit the ink within the nozzles 41 from being dried. Thus, a situation in which the nozzles 41 are clogged can be prevented. Through the capping operation, the ejection surface 47 is covered with a rubber cap (not illustrated). Thus, the discharge ports of the nozzles 41 are sealed.

In a case where ink ejection is resumed after the capping operation, the uncapping operation is performed. The "uncapping operation" is an operation to release the sealed state of the discharge ports. In the uncapping operation, the rubber cap is taken off from the ejection surface 47. Thus, a state of the openings of the nozzles 41 being sealed is released. Following the preparatory wiping thereafter, the ejecting process is performed. The "preparatory wiping" is one type of the wiping operation and means a wiping operation performed after the uncapping operation and before resumption of ink ejection. In the preparatory wiping, the blade 92 is moved in the direction along the ejection surface 47 (the wiping direction D3 in FIG. 3) likewise in the wiping operation illustrated in FIG. 3.

An example of the image formation method according to the second embodiment has been described with reference to FIGS. 1 to 3. Note that the wash fluid is supplied to the ejection surface 47 using the sponge 91 with the wash fluid penetrated therein in the supplying process in the above example. However, a wash fluid supply method is not limited to the above. The wash fluid supply method may be supplying using a sheet with the wash fluid penetrated therein, ejection of the wash fluid by inkjetting, application of the wash fluid using a roller, or spraying the wash fluid. In the image formation method according to the second embodiment, an image may be formed with any of the cartridges 51 fitted into the inkjet recording apparatus. The cartridges 51 each include the first tank 53 that contains the wash fluid according to the first embodiment and the second tank 52 that contains the ink. When the cartridges 51 such as above are fitted into the inkjet recording apparatus, the image formation method according to the second embodiment can be easily implemented. In the image formation method according to the second embodiment, an image may be formed using the ink and the wash fluid that are separately prepared rather than use of the ink and the wash fluid in the cartridges 51.

<Ink to be Used in Image Formation Method>

The following describes an ink used in the image formation method according to the second embodiment. The ink is a water-based ink containing an aqueous solvent. The ink contains for example pigment particles and the aqueous solvent. Preferably, the ink further contains an organic deliquescent agent. In the following description, the organic deliquescent agent contained in the ink may be referred to as a "second organic deliquescent agent". Preferably, the ink further contains at least one of a surfactant, a solution stabilizer, a moisturizing agent, and a penetrating agent.

(Pigment Particles)

Preferably, the pigment particles each include a pigment core and a coating resin, for example. The pigment particles may be added to the ink in the form of a pigment dispersion that is an aqueous solvent in which the pigment particles are dispersed.

(Pigment Core of Pigment Particle)

The pigment core contains a pigment. Examples of pigment include yellow pigments, orange pigments, red pigments, blue pigments, violet pigments, and black pigments. Examples of yellow pigments include C.I. Pigment Yellow 74, 93, 95, 109, 110, 120, 128, 138, 139, 151, 154, 155, 173, 180, 185, or 193. Examples of orange pigments include C.I. Pigment Orange 34, 36, 43, 61, 63, or 71. Examples of red pigments include C.I. Pigment Red 122 or 202. Quinacridon Magenta (PR122) may be used as a red pigment. Examples of blue pigments include C.I. Pigment Blue 15 or 15:3. Examples of violet pigments include C.I. Pigment Violet 19, 23, or 33. An example of black pigments is C.I. Pigment Black 7. Carbon black may be used as a black pigment.

The pigment cores are preferably contained in the ink in an amount of at least 4% by mass and no greater than 8% by mass. As a result of the pigment cores being contained in the ink in an amount of at least 4% by mass, an image having a desired image density can be easily obtained. As a result of the pigment cores being contained in the ink in an amount of no greater than 8% by mass, fluidity of the ink can be easily ensured. For fluidity of the ink being easily ensured, also, an image having a desired image density can be easily obtained. Furthermore, penetrability of the ink in a recording medium can be easily ensured.

The pigment cores preferably have a volume median diameter ($D_{50}$) of at least 30 nm and no greater than 200 nm. As a result of the pigment cores having a volume median diameter ($D_{50}$) in the above value range, the color density, hue, or stability of the ink are increased. More preferably, the pigment cores have a volume median diameter ($D_{50}$) of at least 70 nm and no greater than 130 nm.

(Coating Resin of Pigment Particle)

The coating resin is disposed on a surface of the pigment core. The coating resin is preferably anionic, and is preferably for example at least one of a styrene-acrylic acid-based resin, a styrene-maleate copolymer, a styrene-maleate half-ester copolymer, a vinylnaphthalene-acrylate copolymer, and a vinylnaphthalene-maleate copolymer. More preferably, the coating resin is a styrene-acrylic acid-based resin. As a result of the coating resin being a styrene-acrylic acid-based resin, production of the pigment particles can be facilitated. Furthermore, dispersibility of the pigment cores can be increased.

The styrene-acrylic acid-based resin is a resin including a repeating unit derived from styrene and a repeating unit derived from acrylic acid, methacrylic acid, acrylic acid ester, or methacrylic acid ester. Preferably, the styrene-acrylic acid-based resin is at least one of a copolymer of styrene, acrylic acid, and acrylic acid alkyl ester, a copolymer of styrene, methacrylic acid, methacrylic acid alkyl ester, and acrylic acid alkyl ester, a copolymer of styrene and acrylic acid, a copolymer of styrene, maleic acid, and acrylic acid alkyl ester, a copolymer of styrene and methacrylic acid, and a copolymer of styrene and methacrylic acid alkyl ester. Further preferably, the styrene-acrylic acid-based resin is a copolymer of styrene, methacrylic acid, methacrylic acid alkyl ester, and acrylic acid alkyl ester. Particularly preferably, the styrene-acrylic acid-based resin is a copolymer of styrene, methacrylic acid, methyl methacrylate, and butyl acrylate.

The coating resin preferably has a mass average molecular weight (Mw) of at least 5,000 and no greater than 100,000, and more preferably has a mass average molecular weight (Mw) of at least 15,000 and no greater than 25,000. The coating resin preferably has an acid value of at least 50 mgKOH/g and no greater than 150 mgKOH/g, and more preferably has an acid value of at least 90 mgKOH/g and no greater than 110 mgKOH/g.

The content of the coating resin is preferably at least 15 parts by mass and no greater than 100 parts by mass relative to 100 parts by mass of the pigment cores. As a result of the content of the coating resin being at least 15 parts by mass, strike through is hardly caused in a recording medium after image formation. As a result of the content of the coating resin being no greater than 100 parts by mass by contrast, a desired image density can be easily attained.

(Aqueous Solvent)

The aqueous solvent preferably contains water, and more preferably contains ion exchanged water. In a case where the aqueous solvent contains water, the content of the water in the ink is preferably at least 20% by mass and no greater than 70% by mass. As a result of the content of the water in the ink falling in the above value range, an ink having appropriate viscosity can be provided.

Preferably, the aqueous solvent further contains either or both glycerin and glycol in addition to water. As a result of the aqueous solvent containing either or both glycerin and glycol, ink drying can be further inhibited.

Preferably, the aqueous solvent further contains either or both alcohol and glycol ether in addition to water. As a result of the ink containing either or both alcohol and glycol ether, penetrability of the ink in a recording medium can be increased.

Examples of glycol ether include diethylene glycol mono-ethyl ether, triethylene glycol mono-normal butyl ether, triethylene glycol monoisobuthyl ether, triethylene glycol monoisopropyl ether, and diethylene glycol mono-normal butyl ether.

(Second Organic Deliquescent Agent)

Preferably, the ink further contains the second organic deliquescent agent. As a result of the ink containing the second organic deliquescent agent, the following advantage can be obtained. Adhering ink is formed as a result of ink being dried. Therefore, in a case where the ink contains the second organic deliquescent agent, the adhering ink also contains the second organic deliquescent agent. When supply of the wash fluid to the ejection surface and the purging operation are performed, the second organic deliquescent agent contained in the adhering ink absorbs the wash fluid containing water and the purging ink containing the aqueous solvent. Accordingly, the wash fluid and the purging ink tend to enter between the adhering ink and the ejection surface from the surface of the adhering ink. The adhering ink accordingly tends to readily dissolve in the aqueous solvent and the purging ink, thereby being removed from the ejection surface. Thus, the ejection surface can be favorably washed and impairment of ink ejection performance can be inhibited.

As a result of the ink containing the second organic deliquescent agent, the following advantage can also be obtained. In a case where the ink contains the second organic deliquescent agent, ink left unwiped also contains the second organic deliquescent agent. Therefore, the ink left unwiped absorbs moisture in the air to be liquefied when the uncapping operation is performed. Once the ink left unwiped is liquefied, the preparatory wiping can remove the ink left unwiped.

Examples of the second organic deliquescent agent include sorbitol, trimethylolpropane, and 1,3-bis(2-hydroxyethyl)-5,5-dimethylimidazolidine-2,4-dione. The ink may contain only one second organic deliquescent agent or two or more second organic deliquescent agents. The first organic deliquescent agent contained in the wash fluid and the second organic deliquescent agent contained in the ink may be the same as or different from each other. Sorbitol is preferable as the second organic deliquescent agent.

The second organic deliquescent agent is contained in the ink in an amount of at least 0.1% by mass and no greater than 7.0% by mass. As a result of the second organic deliquescent agent being contained in the ink in an amount of at least 0.1% by mass, a sufficient amount of intrusion of the purging ink can be ensured. As a result of the second organic deliquescent agent being contained in the ink in an amount of no greater than 7.0% by mass, impairment of intermittent ink ejection performance can be inhibited. Preferably, the second organic deliquescent agent is contained in the ink in an amount of at least 0.5% by mass and no greater than 5.0% by mass. The term "intermittent ink ejection performance" herein refers to ink ejection performance when the ink is intermittently ejected without performing the capping operation. For example, intermittent ink ejection performance is ink ejection performance when the ink is ejected at an interval of several hours.

Note that in a case where the ink contains two or more second organic deliquescent agents, a total amount of the second organic deliquescent agents in the ink is at least 0.1% by mass and no greater than 7.0% by mass. Preferably, the second organic deliquescent agents are contained in the ink in a total amount of at least 0.5% by mass and no greater than 5.0% by mass.

(Surfactant)

Preferably, the ink further contains a surfactant. As a result of the ink containing a surfactant, wettability of the ink with respect to a recording medium is improved. The surfactant included in the ink is preferably a nonionic surfactant. Preferably, the nonionic surfactant is contained in the ink in an amount of at least 0.05% by mass and no greater than 2.0% by mass. As a result of the nonionic surfactant being contained in the ink in an amount in the above value range, image density is increased while image offset is inhibited.

The nonionic surfactant contained in the ink is preferably an acetylene glycol-based surfactant, and more preferably an ethylene oxide adduct of acetylenediol.

(Solution Stabilizer)

Preferably, the ink further contains a solution stabilizer. As a result of the ink containing the solution stabilizer, components contained in the ink tend to be compatible, thereby achieving a stable solution state of the ink. Preferably, the solution stabilizer is at least one of 2-pyrrolidone, N-methyl-2-pyrrolidone, and γ-butyrolactone. The solution stabilizer is contained in the ink preferably in an amount of at least 1.0% by mass and no greater than 20.0% by mass, and more preferably in an amount of at least 3.0% by mass and no greater than 15.0% by mass.

(Moisturizing Agent)

Preferably, the ink further contains a moisturizing agent. As a result of the ink containing the moisturizing agent, liquid components can be inhibited from volatilizing from the ink. Preferably the moisturizing agent is at least one of polyalkylene glycols, alkylene glycols, and glycerin. A preferable polyalkylene glycol is polyethylene glycol or polypropylene glycol. A preferable alkylene glycol is ethylene glycol, propylene glycol, butylene glycol, diethylene glycol, dipropylene glycol, trimethylene glycol (i.e., 1,3-propanediol), triethylene glycol, tripropylene glycol, 1,2,6-hexanetriol, thiodiglycol, 1,3-butanediol, or 1,5-pentanediol. The moisturizing agent is contained in the ink preferably in an amount of at least 2.0% by mass and no greater than 30.0% by mass, and more preferably in an amount of at least 10.0% by mass and no greater than 25.0% by mass.

(Penetrating Agent)

Preferably, the ink further contains a penetrating agent. As a result of the ink containing the penetrating agent, wettability of the ink with respect to a recording medium is improved. The penetrating agent is preferably at least one of 1,2-hexylene glycol, 1,2-octanediol, 2,4-diethyl-1,5-pentanediol, 2-butyl-2-ethyl-1,3-propanediol, triethylene glycol monobutyl ether, and diethylene glycol monobutyl ether. Preferably, the penetrating agent is contained in the ink in an amount of at least 0.50% by mass and no greater than 20.0% by mass.

Preferably, at least one material of the aqueous solvent, the organic deliquescent agent, and the solution stabilizer is the same or similar between the ink and the wash fluid. As a result of at least one material of them being the same or similar therebetween, affinity between the wash fluid and the ink can be increased. The adhering ink herein is formed as a result of the ink being dried. Therefore, affinity between the wash fluid and the adhering ink can be increased by increasing affinity between the wash fluid and the adhering ink. The wash fluid accordingly can enter between the adhering ink and the ejection surface further easily. In order to form a preferable image on a recording medium, the viscosity at 25° C. of the ink is preferably at least 5.0 mPa·s and no greater than 7.5 mPa·s, more preferably at least 5.0 mPa·s and less than 7.0 mPa·s, and further preferably at least 5.8 mPa·s and no greater than 6.2 mPa·s.

(Ink Production Method)

An example of ink production methods includes a process to prepare a pigment dispersion and a process to mix the pigment dispersion and the other ink components.

(Process to Prepare Pigment Dispersion)

First, a coating resin is synthesized. Specifically, a polymerization initiator and a monomer or a prepolymer capable of synthesizing a coating resin through polymerization are added to a specific solvent, and heating at a specific temperature is performed under reflux. As a result, the coating resin is synthesized. More specifically, styrene, (meth) acrylic acid, (meth)acrylic acid alkyl ester, and a polymerization initiator are added to a mixed liquid of isopropyl alcohol and methyl ethyl ketone, and heating at 70° C. is performed under reflux. Through the above, a styrene-acrylic acid-based resin is synthesized.

Subsequently, the synthesized resin, pigment cores, and an aqueous solvent are kneaded using a disperser (for example, a media disperser). Thus, a pigment disperser including the pigment particles is obtained. By changing the particle diameter of a medium (for example, the diameter of beads) used in the media disperser, the degree of dispersion of the pigment particles, the amount of resin separated from the pigment particles in the pigment dispersion, or the particle diameter of the pigment particles can be adjusted. For example, the particle diameter of the pigment particles tends to decrease as the particle diameter of the medium is reduced.

(Process to Mix Pigment Dispersion and Other Ink Components)

The resultant pigment dispersion and other ink components are mixed together. Preferably, the pigment dispersion and the other ink components are mixed together using a stirrer (for example, "THREE-ONE MOTOR (registered Japanese trademark) BL-600", product of Shinto Scientific Co., Ltd.). Examples of the other ink components include at least one of the second organic deliquescent agent, the aqueous solvent, the surfactant, the solution stabilizer, the moisturizing agent, and the penetrating agent. After the pigment dispersion and the other ink components are mixed together, filtration is performed as necessary. Thus, the ink is produced. The ink used in the image formation method according to the second embodiment has been described so far.

EXAMPLES

The following describes examples of the present disclosure. In evaluation in which errors may occur, an evaluation value was calculated by calculating the arithmetic mean of an appropriate number of measured values in order to ensure that any errors were sufficiently small.

[Preparation of Wash Fluid]

Wash fluids (b) to (m) according to examples and comparative examples were prepared. Materials contained in the respective wash fluids (b) to (m) and their blending amounts are shown in Tables 1 and 2.

TABLE 1

|  |  | Example 1 | Example 2 | Example 3 | Example 4 | Example 5 | Example 6 |
|---|---|---|---|---|---|---|---|
|  | Wash fluid | b | c | d | e | f | g |
| Blending | Water | 69.40 | 69.40 | 58.40 | 71.20 | 63.70 | 71.79 |
| amount | 2-Pyrrolidone | 3.00 | 3.00 | 3.00 | 3.00 | 3.00 | 3.00 |
| (% by mass) | Surfactant 1 | 2.50 (0.75) | — | — | — | — | — |
|  | Surfactant 2 | — | 2.50 (0.50) | — | — | — | — |
|  | Surfactant 3 | — | — | 2.50 (0.75) | 2.50 (0.75) | 10.00 (3.00) | 0.20 (0.06) |
|  | Surfactant 4 | — | — | — | — | — | — |
|  | NaOH | 0.10 | 0.10 | 0.10 | 0.10 | 0.30 | 0.01 |

TABLE 1-continued

|  |  | Example 1 | Example 2 | Example 3 | Example 4 | Example 5 | Example 6 |
|---|---|---|---|---|---|---|---|
|  | Organic deliquescent agent A | 2.00 | 2.00 | 30.00 | 0.20 | 2.00 | 2.00 |
|  | Butycenol 30 | 20.00 | 20.00 | 5.00 | 20.00 | 20.00 | 20.00 |
|  | 1,3-Propanediol | 3.00 | 3.00 | 1.00 | 3.00 | 1.00 | 3.00 |
| Physical property value | Viscosity [mPa · s] | 5.8 | 5.8 | 7.5 | 6.0 | 6.5 | 6.0 |
|  | Surface tension [mN/m] | 33 | 33 | 33 | 33 | 32 | 35 |
|  | pH | 7.8 | 8.5 | 8.4 | 8.8 | 8.3 | 8.7 |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
|  | Wash fluid | h | i | j | k | l | m |
| Blending amount (% by mass) | Water | 71.90 | 72.40 | 71.00 | 71.40 | 48.40 | 68.00 |
|  | 2-Pyrrolidone | 3.00 | 3.00 | 3.00 | 3.00 | 3.00 | 3.00 |
|  | Surfactant 1 | — | — | — | — | — | — |
|  | Surfactant 2 | — | — | — | — | — | — |
|  | Surfactant 3 | — | 2.50 (0.75) | — | 2.50 (0.75) | 2.50 (0.75) | 15.00 (4.50) |
|  | Surfactant 4 | — | — | 1.00 (1.00) | — | — | — |
|  | NaOH | 0.10 | 0.10 | — | 0.10 | 0.10 | 1.00 |
|  | Organic deliquescent agent A | 2.00 | 2.00 | 2.00 | — | 40.00 | 2.00 |
|  | Butycenol 30 | 20.00 | 20.00 | 20.00 | 20.00 | 5.00 | 10.00 |
|  | 1,3-Propanediol | 3.00 | — | 3.00 | 3.00 | 1.00 | 1.00 |
| Physical property value | Viscosity [mPa · s] | 6.0 | 6.2 | 6.0 | 6.0 | 8.0 | 6.4 |
|  | Surface tension [mN/m] | 35 | 30 | 28 | 33 | 33 | 30 |
|  | pH | 8.3 | 7.9 | 8.1 | 8.4 | 8.4 | 9.0 |

In Tables 1 and 2, an aqueous sodium hydroxide solution (1 mol/L) was used as "NaOH". "Organic deliquescent agent A" refers to 1,3-bis(2-hydroxyethyl)-5,5-dimethylimidazolidine-2,4-dione. "Butycenol 30" refers to triethylene glycol monobutyl ether ("BUTYCENOL 30", product of KH Neochem Co., Ltd.). In Tables 1 and 2, "-" refers to no containment of a corresponding component. Note that the viscosity of each wash fluid was measured in accordance with a method described in "JIS Z 8803:2011 (Methods for viscosity measurement of liquid)". The surface tension of each wash fluid was measured in accordance with the Wilhelmy method (plate method) using a surface tensiometer ("AUTOMATIC SURFACE TENSIOMETER DY-300", product of Kyowa Interface Science Co., Ltd.). The viscosity and the surface tension of each wash fluid were measured in a measurement environment at 25° C. The pH of each wash fluid was measured using a pH meter ("D-51", product of HORIBA, Ltd.).

In Tables 1 and 2, "Surfactants 1 to 4" were as shown in Table 3. The rows of surfactants in Blending amount in Tables 1 and 2 each show amounts (unit: % by mass) of a corresponding surfactant (for example, an aqueous solution of a surfactant) added in preparation of the respective wash fluids, and a substantial amount (unit: % by mass) of the surfactant converted from a corresponding surfactant solid concentration shown in Table 3. The substantial amount of the surfactant is calculated from an equation "substantial amount of surfactant (unit: % by mass)=amount of surfactant added in preparation of wash fluid (unit: % by mass)× surfactant solid concentration (unit: % by mass)/100". The substantial amount of the surfactant converted from the surfactant solid concentration corresponds to a substantial content (unit: % by mass) of the surfactant in a corresponding wash fluid. In Tables 1 and 2, the substantial amounts of the surfactants converted from respective surfactant solid concentrations are shown in parentheses. For example, "2.50 (0.75)" indicated in the row of the surfactant 1 in Blending amount for the wash fluid (b) in Table 1 indicates that 2.50% by mass of the surfactant 1 (an aqueous solution of the surfactant 1) was added in preparation of the wash fluid (b) and that the substantial amount of the surfactant 1 in the wash fluid (b) was 0.75% by mass.

TABLE 3

|  | Material | Surfactant solid concentration [wt %] | Ionicity |
|---|---|---|---|
| Surfactant 1 | N-coconut oil fatty acid acyl-L-glutamic acid triethanolamine | 30 | Anionic |
| Surfactant 2 | Coconut oil fatty acid methyl taurine sodium | 20 | Anionic |
| Surfactant 3 | Coconut oil fatty acid amidopropyl betaine | 30 | Zwitterionic |
| Surfactant 4 | SURFYNOL 485 | 100 | Nonionic |

In Table 3, the surfactant 1 was "AMINOSURFACT (registered Japanese trademark)" produced by ASAHI KASEI FINECHEM CO., LTD. The surfactant 2 was "DYAPON (registered Japanese trademark) K-TS" produced by NOF Corporation. The surfactant 3 was "AMOGEN (registered Japanese trademark) CB-H" produced by DKS Co. Ltd. The surfactant 4 was "SURFYNOL (registered Japanese trademark) 485" produced by Nissin Chemical Industry Co., Ltd.

<Preparation of Wash Fluid (b)>

A beaker was charged with 69.40 g of water, 3.00 g of 2-pyrrolidone, 2.50 g of the surfactant 1 (surfactant solid content amount: 0.75 g), 0.10 g of an aqueous sodium hydroxide solution (1 mol/L), 2.00 g of the organic deliquescent agent A (1,3-bis(2-hydroxyethyl)-5,5-dimethylimidazolidine-2,4-dione), 20.0 g of BUTYCENOL 30, and 3.00 g of 1,3-propanediol. The beaker contents were stirred at a rotational speed of 400 rpm using a stirrer ("THREE-ONE MOTOR BL-600", product of Shinto Scientific Co., Ltd.) until the beaker contents were uniformly mixed. Through the above, a wash fluid (b) was obtained.

<Preparation of Wash Fluids (c) to (m)>

Wash fluids (c) to (m) were each prepared by the same method as that for preparing the wash fluid (b) in all aspects other than that corresponding materials shown in Tables 1 and 2 were added into a beaker at the respective blending amounts shown in Tables 1 and 2.

[Ink Preparation]

Inks in four different colors were prepared for use in evaluation of the wash fluids. The inks in the four colors were a cyan-based ink (I-C), a yellow-based ink (I-Y), a magenta-based ink (I-M), and a black-based ink (I-B).

<Preparation of Ink (I-C)>

Table 4 shows materials contained in the ink (I-C) and blending amounts thereof.

TABLE 4

| Ink (I-C) | |
| --- | --- |
| Material | Blending amount (% by mass) |
| Pigment dispersion (L1) | 40.0 |
| Sorbitol | 4.0 |
| EO adduct of acetylenediol | 1.0 |
| Ether | 10.0 |
| 2-Pyrrolidone | 7.0 |
| 1,3-Propanediol | 7.0 |
| Ion exchanged water | Adjusted amount |
| Glycerin | Adjusted amount |
| Total | 100.0 |

In Table 4, "EO adduct of acetylenediol" refers to "OLFINE (registered Japanese trademark) E1010" produced by Nissin Chemical Industry Co., Ltd., and "EO" refers to ethylene oxide. "Ether" refers to triethylene glycol mono-normal butyl ether. That the amount of ion exchanged water is "adjusted amount" and that the amount of glycerin is "adjusted amount" mean that each blending amount of ion exchanged water and glycerin were adjusted so that the ink (I-C) had a viscosity at 25° C. of 6.0±0.2 mPa·s. Note that the viscosity of the ink (I-C) was measured in accordance with a method described in "JIS Z 8803:2011 (Methods for viscosity measurement of liquid)". The viscosity of the ink (I-C) was measured in a measurement environment at a temperature of 25° C. Materials of "pigment dispersion (L1)" and blending amounts thereof were as shown in Table 5.

TABLE 5

| Pigment dispersion (L1) | |
| --- | --- |
| Material | Blending amount (% by mass) |
| Ion exchanged water | Remainder |
| Resin B-Na | 6.0 |
| Pigment (cyan-based pigment) | 15.0 |
| 1,2-Octanediol | 0.5 |
| Total | 100.0 |

In Table 5, "Resin B-Na" refers to a resin B neutralized with an aqueous sodium hydroxide (NaOH) solution. The ink (I-C) contained 40.0% by mass of the pigment dispersion (L1) (see Table 4). The pigment dispersion (L1) contained 15.0% by mass of a cyan-based pigment (see Table 5). Therefore, the ink (I-C) contained 6.0% by mass of the cyan-based pigment. The following describes a method for preparing the ink (I-C).

(Synthesis of Resin B)

First, the resin B was synthesized. Specifically, a stirrer bar, a nitrogen inlet tube, a condenser (stirring machine), and a dropping funnel were set on a four-necked flask (capacity: 1,000 mL). Next, 100 g of isopropyl alcohol and 300 g of methyl ethyl ketone were added into the flask. Heating at 70° C. was performed under reflux while the flask contents were subjected to nitrogen bubbling.

Separately, 40.0 g of styrene, 10.0 g of methacrylic acid, 40.0 g of methyl methacrylate, 10.0 g of butyl acrylate, and 0.400 g of azobisisobutyronitrile (AIBN, polymerization initiator) were mixed together to obtain a monomer solution. The monomer solution was dripped into the flask over approximately 2 hours under reflux with heating at 70° C. After the dripping, heating at 70° C. under reflux was performed for additional 6 hours.

A solution containing 0.200 g of AIBN and methyl ethyl ketone were dripped into the flask over 15 minutes. After the dripping, heating at 70° C. under reflux was performed for additional 5 hours. Thus, the resin B (a styrene-acrylic acid-based resin) was obtained. The resultant resin B had a mass average molecular weight (Mw) of 20,000 and an acid value of 100 mgKOH/g.

The mass average molecular weight Mw of the resin B was measured using a gel filtration chromatography ("HLC-8020GPC", product of Tosoh Corporation) under the following conditions.

Column: "TSKgel Super Multipore HZ-H" produced by Tosoh Corporation (semimicron column having an inner diameter of 4.6 mm and a length of 15 cm).
Number of columns: 3.
Eluent: Tetrahydrofuran.
Flow rate: 0.35 mL/minute.
Sample injection amount: 10 µL.
Measurement temperature: 40° C.
Detector: IR detector.

Note that a calibration curve was plotted using n-propylbenzene and seven TSKgel Standard Polystyrenes, i.e., F-40, F-20, F-4, F-1, A-5000, A-2500, and A-1000 selected from TSKgel Standard Polystyrenes produced by Tosoh Corporation.

The acid value of the resin B was obtained in accordance with a method described in Japanese Industrial Standards (JIS) K0070-1992 (Test methods for acid value, saponification value, ester value, iodine value, hydroxyl value and unsaponifiable matter of chemical products).

(Preparation of Pigment Dispersion (L1))

Next, the pigment dispersion (L1) was prepared using the thus synthesized resin B. Specifically, a vessel (capacity: 0.6 L) of a media disperser ("DYNO (registered Japanese trademark) MILL", product of Willy A. Bachofen AG) was charged with 6.0% by mass of the resin B, 15.0% by mass of Phthalocyanine Blue 15:3 ("LIONOL (registered Japanese trademark) BLUE FG-7330", product of TOYO INK CO., LTD.), 0.5% by mass of 1,2-octanediol, and ion exchanged water (remainder).

An aqueous sodium hydroxide solution in an amount necessary for neutralization of the resin B was added into the vessel. Here, an aqueous NaOH solution was added into the vessel so that the vessel contents had a pH of 8. More specifically, an aqueous NaOH solution of which mass was 1.1 times a neutralization equivalent was added into the vessel. The mass of water contained in the aqueous NaOH solution and the mass of water generated in the neutralization reaction were included in the mass of ion exchanged water.

A medium (zirconia beads each having a diameter of 0.5 mm) was filled in the vessel so that the filling amount thereof was 70% by volume relative to the capacity of the vessel. The vessel contents were kneaded using the media disperser while the vessel was cooled with water under conditions of a temperature of 10° C. and a peripheral speed of 8 m/second so that the pigment particles had a volume median diameter ($D_{50}$) of at least 70.0 nm and no greater than 130 nm. Thought the above, the pigment dispersion (L1) was obtained.

The volume median diameter ($D_{50}$) of the pigment particles was measured using a laser diffraction particle size distribution analyzer ("ZETASIZER NANO ZS", product of Malvern Instruments Ltd.).

(Mixing of Pigment Dispersion (L1) and Other Ink Components)

Materials shown in Table 4 were added into a beaker at a blending amount shown in Table 4. The beaker contents were stirred at a rotational speed of 400 rpm using a stirrer ("THREE-ONE MOTOR BL-600", product of Shinto Scientific Co., Ltd.) to be uniformly mixed. The resultant mixed liquid was filtered using a filter (pore size: 5 μm) to remove foreign matter and coarse particles contained in the mixed liquid. Through the above, an ink (I-C) was obtained.

<Preparation of Ink (I-Y)>

A yellow-based ink (I-Y) was prepared by the same method as that for preparing the ink (I-C) in all aspects other than that 15.0% by mass of the cyan-based pigment shown in Table 5 was changed to 16.3% by mass of a yellow-based pigment (C.I. Pigment Yellow 74). The ink (I-Y) contained 40.0% by mass of the pigment dispersion (L1) (see Table 4). The pigment dispersion (L1) used in the preparation of the ink (I-Y) contained 16.3% by mass of the yellow-based pigment. The ink (I-Y) accordingly contained 6.5% by mass of the yellow-based pigment.

<Preparation of Ink (I-M)>

A magenta-based ink (I-M) was prepared by the same method as that for preparing the ink (I-C) in all aspects other than that 15.0% by mass of the cyan-based pigment shown in Table 5 was changed to 20.0% by mass of a magenta-based pigment (Quinacridone Magenta PR122). The ink (I-M) contained 40.0% by mass of the pigment dispersion (L1) (see Table 4). The pigment dispersion (L1) used in the preparation of the ink (I-M) contained 20.0% by mass of the magenta-based pigment. The ink (I-M) accordingly contained 8.0% by mass of the magenta-based pigment.

<Preparation of Ink (I-B)>

A black-based ink (I-B) was prepared by the same method as that for preparing the ink (I-C) in all aspects other than that 15.0% by mass of the cyan-based pigment shown in Table 5 was changed to 20.0% by mass of a black-based pigment (carbon black). The ink (I-B) contained 40.0% by mass of the pigment dispersion (L1) (see Table 4). The pigment dispersion (L1) used in the preparation of the ink (I-B) contained 20.0% by mass of the black-based pigment. The ink (I-B) accordingly contained 8.0% by mass of the black-based pigment.

[Evaluation Method and Evaluation Results]

<Evaluation of Washability on Ejection Surface of Recording Head>

A first evaluation apparatus was prepared first. As the first evaluation apparatus, an inkjet recording apparatus (prototype evaluation apparatus produced by KYOCERA Document Solutions Inc.) including 4 recording heads (each are a linehead) was used. Each of the recording heads was a piezoelectric head (product of KONICA MINOLTA JAPAN, INC.) including 512 nozzles (256×2 rows) and having a resolution of 360 dpi (=180 dpi×2 rows), a droplet amount of 14 pL, and a drive frequency of 12.8 kHz. The recording heads were arranged at intervals of 20 mm in a fashion that a longitudinal direction of the recording heads was perpendicular to a conveyance direction of paper. The inks (I-C), (I-Y), (I-M), and (I-B) were loaded into the respective 4 recording heads. The conveyance speed of the paper was set at 350 mm/second.

Next, an image (printing rate 100%) was printed (corresponding to the ejecting process) consecutively on 5,000 sheets of paper ("P", product of Fuji Xerox Co., Ltd.) using the first evaluation apparatus in an environment at a temperature of 25° C. and a relative humidity of 60%. After the 5,000-sheet printing, the purging operation, wash fluid supply, and the wiping operation were performed. Specifically, each of the 4 recording heads performed the purging process (purging operation) first. Sheets (cut products of "BEMCOT (registered Japanese trademark) M-3II, product of Asahi Kasei Corp., each having a size larger than the size of the ejection surface) permeated with 3 g of a wash fluid (specifically, one of the wash fluids (b) to (m)) was prepared. The sheets were made in contact with the respective ejection surfaces of the 4 recording heads for 30 seconds (wash fluid supply). Subsequently, the ejection surface of each of the 4 recording heads was wiped using a tip end of a blade included in the first evaluation apparatus (wiping operation). A series of the operations including the purging operation, the wash fluid supply, and the wiping operation (also referred to below as a maintenance operation) was performed one time.

After the maintenance operation, each ejection surface was observed using an optical microscope at a magnification of 50×. Thereafter, whether or not ink left unwiped was attached to the ejection surface was confirmed. From the results of the confirmation, washability on the ejection surface of each recording head was evaluated in accordance with the following criteria. Evaluation results are shown in Tables 6 and 7. Evaluation A and evaluation B were rated as good in washability on the ejection surface of each recording head. Evaluation C was rated as poor (NG) in washability on the ejection surface of each recording head.

Evaluation A: No ink attachment to the ejection surface was observed.

Evaluation B: A slight amount of ink attached to the ejection surface was observed.

Evaluation C: A noticeable amount of ink attached to the ejection surface was observed.

<Evaluation of Ink Ejection Performance Directly after Maintenance Operation>

A second evaluation apparatus was prepared first. As the second evaluation apparatus, an inkjet recording apparatus (prototype evaluation apparatus produced by KYOCERA Document Solutions Inc.) including 4 recording heads (each are a linehead) was used. The recording heads each are a piezoelectric head including 2,656 nozzles and having a droplet amount of 10 pL and a drive frequency of 20 kHz. The inks (I-C), (I-Y), (I-M), and (I-B) were loaded into the respective 4 recording heads. Evaluation of ink ejection performance was performed in an environment at a temperature of 25° C. and a relative humidity of 60%.

Dot rows were formed on a sheet of paper ("$C^2$", product of Fuji Xerox Co., Ltd., A4-size plain paper) using the second evaluation apparatus. More specifically, one droplet of ink was ejected toward one sheet of the paper from each of the nozzles of the 4 recording heads. The sheet with the dot rows formed thereon as above was taken to be an initial evaluation sheet.

Subsequently, an image (printing rate 100%) was consecutively printed (corresponding to the ejecting process) on 5,000 sheets of paper ("$C^2$", product of Fuji Xerox Co., Ltd., A4-size plain paper) using the second evaluation apparatus. After the 5,000-sheet printing, the maintenance operation described above in <Evaluation of Washability on Ejection Surface of Recording Head> was performed one time.

Directly after the maintenance operation, dot rows were formed on one sheet of paper ("$C^2$", product of Fuji Xerox Co., Ltd., A4-size plain paper). More specifically, one droplet of ink was ejected toward one sheet of the paper from each nozzle of the 4 recording heads. The sheet with the dot rows formed thereon as above was taken to be a post-5,000-sheet printing evaluation sheet.

Each of the initial evaluation sheet and the post-5,000-sheet printing sheet obtained as above was observed using an image analyzer ("HIGH-SPEED HIGH-DEFINITION IMAGE PROCESSING ANALYZING SYSTEM DOT ANALYZER DA-6000", product of Oji Scientific Instruments Co., Ltd.) to confirm occurrence or non-occurrence of dot row irregularity. More specifically, a misalignment distance in a longitudinal direction of each evaluation sheet and a misalignment distance in a width direction of the evaluation sheet were measured for each of 2,656 dots of the ink (I-C), 2656 dots of the ink (I-Y), 2656 dots of the ink (I-M), and 2656 dots of the ink (I-B) formed on the evaluation sheet. A number average value ($3\sigma x$, unit: μm) of misalignment distances in the width direction of the evaluation sheet and a number average value ($3\sigma y$, unit: μm) of the misalignment distances in the longitudinal direction of the evaluation sheet were calculated from the results of measurement. Subsequently, a misalignment distance $3\sigma$ (unit: μm) of the dot rows formed on the evaluation sheet was calculated from an equation "$3\sigma = 3\sqrt{(\sigma x)^2 + (\sigma y)^2}$". Furthermore, an amount $\Delta 3\sigma$ (unit: μm) of change in misalignment distance of the dot rows formed on the evaluation sheet between before and after the 5,000-sheet printing was calculated from an equation "$\Delta 3\sigma = |(3\sigma$ of initial evaluation sheet$) - (3\sigma$ of post-5,000-sheet printing evaluation sheet$)|$".

Ink ejection performance directly after the maintenance operation was evaluated from the calculated amount $\Delta 3\sigma$ of change in accordance with the following criteria. Evaluation results are shown in Tables 6 and 7. Evaluation A was rated as good in evaluation of ink ejection performance directly after the maintenance operation. Evaluation B was rated as poor (NG) in evaluation of ink ejection performance directly after the maintenance operation.

Evaluation A: The amount $\Delta 3\sigma$ of change was less than 3 μm.

Evaluation B: The amount $\Delta 3\sigma$ of change was equal to or larger than 3 μm.

<Evaluation of Ink Ejection Performance after 3-Day Elapse from Maintenance Operation>

Ink ejection performance after 3-day elapse from the maintenance operation was evaluated by the same method as that described above in <Evaluation of Ink Ejection Performance Directly After Maintenance Operation> in all aspects other than that formation of dot rows on one sheet of the paper directly after the maintenance operation was changed to formation of dot rows on one sheet of the paper after 3 days elapsed from the maintenance operation. Evaluation A was rated as good in evaluation of ink ejection performance after 3 days elapsed from the maintenance operation. Evaluation B was rated as poor (NG) in evaluation of ink ejection performance after 3 days elapsed from the maintenance operation.

<Evaluation of Inhibition of Shaving on Water-Repellent Film of Ejection Surface of Recording Head>

The first evaluation apparatus was prepared that was used above in <Evaluation of Washability on Ejection Surface of Recording Head>. First, a contact angle $\theta 1$ of the ejection surface of each recording head included in the first evaluation apparatus relative to ion exchanged water was measured. Next, the maintenance operation described above in <Evaluation of Washability on Ejection Surface of Recording Head> was performed repetitively using the first evaluation apparatus in an environment at a temperature of 25° C. and a relative humidity of 60%. Each $1,000^{th}$ time of the maintenance operation, a contact angle $\theta 2$ of the ejection surface relative to ion exchanged water was measured. The contact angles $\theta 1$ and $\theta 2$ were measured using a contact angle measuring device ("OCA40", product of EKO Instruments B. V.). A contact angle difference between before and after the maintenance operation was calculated from an equation "contact angle difference=contact angle $\theta 1$-contact angle $\theta 2$". When the contact angle difference was equal to or larger than 10 degrees, it was determined that water repellency of the ejection surface was degraded due to the water-repellent film of the ejection surface being shaved through the maintenance operation. A case where the contact angle difference becomes equal to or larger than 10 degrees through a less number of times of repetition of the maintenance operation indicates that the water-repellent film of the ejection surface tends to be more readily shaved and repellency of the ejection surface tends to more readily degrade. In view of the foregoing, inhibition of shaving on the water-repellent film of the ejection surface was evaluated according to the number of times of repetition of the maintenance operation and the contact angle difference in accordance with the following criteria. Evaluation results are shown in Tables 6 and 7. When evaluation A or B was rated, inhibition of shaving on the water-repellent film of the ejection surface was evaluated as good. When evaluation C or D was rated, inhibition of shaving on the water-repellent film of the ejection surface was evaluated as poor (NG).

Evaluation A: The contact angle difference became 10 degrees or larger after the maintenance operation was repeated 21,000 times or more.

Evaluation B: The contact angle difference became 10 degrees or larger after the maintenance operation was repeated at least 11,000 times and no less than 21,000 times.

Evaluation C: The contact angle difference became 10 degrees or larger after the maintenance operation was repeated at least 4,000 times and no less than 11,000 times.

Evaluation D: The contact angle difference became 10 degrees or larger after the maintenance operation was repeated less than 4,000 times.

TABLE 6

|  |  | Example 1 | Example 2 | Example 3 | Example 4 | Example 5 | Example 6 |
|---|---|---|---|---|---|---|---|
|  | Wash fluid | b | c | d | e | f | g |
| Evaluation | Washability | A | A | A | B | A | B |
|  | Ejection performance (directly after operation) | A | A | A | A | A | A |
|  | Ejection performance (3 days after operation) | A | A | A | A | A | A |
|  | Film shaving | A | A | A | A | A | B |

TABLE 7

|  |  | Comparative Example | | | | | |
|---|---|---|---|---|---|---|---|
|  |  | Comparative Example 1 | Comparative Example 2 | Comparative Example 3 | Comparative Example 4 | Comparative Example 5 | Comparative Example 6 |
|  | Wash fluid | h | i | j | k | l | m |
| Evaluation | Washability | B | A | C (NG) | C (NG) | B | C (NG) |
|  | Ejection performance (directly after operation) | A | A | B (NG) | B (NG) | B (NG) | B (NG) |
|  | Ejection performance (3 days after operation) | A | B (NG) | A | B (NG) | B (NG) | B (NG) |
|  | Film shaving | C (NG) | C (NG) | D (NG) | B | B | C (NG) |

In Tables 6 and 7, "Washability" refers to evaluation of washability on the ejection surface of the recording head. "Ejection performance (directly after operation)" refers to evaluation of ink ejection performance directly after the maintenance operation. "Ejection performance (3 days after operation)" refers to evaluation of ink ejection performance after 3 days elapsed from the maintenance operation. "Film shaving" refers to evaluation of inhibition of shaving on the water-repellent film of the ejection surface of the recording head. "NG" refers to that a result of corresponding evaluation was poor.

As shown in Table 1, each of the wash fluids (b) to (g) contained water, a coconut oil fatty acid surfactant, an organic deliquescent agent, a polyhydric alcohol, and a basic inorganic compound. The polyhydric alcohol was an alkanediol (specifically, 1,3-propanediol). The coconut oil fatty acid surfactant was contained in an amount of at least 0.01% by mass and no greater than 3.00% by mass. The organic deliquescent agent was contained in an amount of at least 0.10% by mass and no greater than 30.00% by mass. As shown in Table 6, when the maintenance operation was performed using any of the wash fluids (b) to (g), the evaluation result of washability on the ejection surface of the recording head, the evaluation result of ink ejection performance directly after the maintenance operation, the evaluation result of ink ejection performance after 3 days elapsed from the maintenance operation, and the evaluation result of inhibition of shaving on the water-repellent film of the ejection surface of the recording head were each rated as good.

As shown in Table 2, the wash fluid (h) contained no surfactant. As shown in Table 7, when the maintenance operation was performed using the wash fluid (h), the evaluation result of inhibition of shaving on the water-repellent film of the ejection surface of the recording head was rated as poor. As shown in Table 2, the wash fluid (i) did not contain a polyhydric alcohol (specifically, 1,3-propanediol). As shown in Table 7, when the maintenance operation was performed using the wash fluid (i), the evaluation result of ink ejection performance after 3 days elapsed from the maintenance operation and the evaluation result of inhibition of shaving on the water-repellent film of the ejection surface of the recording head were each rated as poor. As shown in Table 2, the wash fluid (j) contained SURFYNOL (registered Japanese trademark) 485 as a surfactant, which was not a coconut oil fatty acid surfactant. The wash fluid (j) did not contain a basic inorganic compound (specifically, sodium hydroxide). As shown in Table 7, when the maintenance operation was performed using the wash fluid (j), the evaluation result of washability on the ejection surface of the recording head, the evaluation result of ink ejection performance directly after the maintenance operation, and the evaluation result of inhibition of shaving on the water-repellent film of the ejection surface of the recording head each were rated as poor. As shown in Table 2, the wash fluid (k) contained no organic deliquescent agent. As shown in Table 7, when the maintenance operation was performed using the wash fluid (k), the evaluation result of washability on the ejection surface of the recording head, the evaluation result of ink ejection performance directly after the maintenance operation, and the evaluation result of ink ejection performance after 3 days elapsed from the maintenance operation were each rated as poor. As shown in Table 2, the content of the organic deliquescent agent in the wash fluid (l) was greater than 30.00% by mass. As shown in Table 7, when the maintenance operation was performed using the wash fluid (l), the evaluation result of ink ejection performance directly after the maintenance operation and the evaluation result of ink ejection performance after 3 days elapsed from the maintenance operation were each rated as poor. As shown in Table 2, the content of the coconut oil fatty acid surfactant in the wash fluid (m) was greater than 3.00% by mass. As shown in Table 7, when the maintenance operation was performed using the wash fluid (m), the evaluation result of washability on the ejection surface of the recording head, the evaluation result of ink ejection performance directly after the maintenance operation, the evaluation result of ink ejection performance after 3 days elapsed from the maintenance operation, and the evaluation result of inhibition of shaving on the water-repellent film of the ejection surface of the recording head were each rated as poor.

From the above, it was indicated that the wash fluids (b) to (g) each encompassed within the present disclosure were excellent in washability on the ejection surface of the recording head, inhibition of impairment of ink ejection performance, and inhibition of shaving on the water-repellent film of the ejection surface of the recording head when compared to the wash fluids (h) to (m).

What is claimed is:

1. A wash fluid for use in an inkjet recording apparatus, comprising:
    water, a coconut oil fatty acid surfactant, an organic deliquescent agent, a polyhydric alcohol, and a basic inorganic compound, wherein
    the polyhydric alcohol is an alkanediol,
    the coconut oil fatty acid surfactant is contained in an amount of at least 0.01% by mass and no greater than 3.00% by mass,
    the organic deliquescent agent is contained in an amount of at least 0.10% by mass and no greater than 30.00% by mass, and
    the wash fluid has a viscosity of at least 5.5 mPa s and no greater than 7.5 mPa s, the viscosity of the wash fluid being measured at 25° C. in accordance with a method for viscosity measurement of liquid described in JIS Z 8803:2011.

2. The wash fluid according to claim 1, wherein
    the coconut oil fatty acid surfactant includes at least one of coconut oil fatty acid amidopropyl betaine, coconut oil fatty acid methyl taurine sodium, N-coconut oil fatty acid acyl-L-glutamic acid triethanolamine, and coconut oil fatty acid diethanolamide.

3. The wash fluid according to claim 1, wherein
    the organic deliquescent agent includes 1,3-bis(2-hydroxyethyl)-5,5-dimethylimidazolidine-2,4-dione.

4. The wash fluid according to claim 1, wherein
    the alkanediol is an alkanediol having a carbon number of at least 1 and no greater than 6.

5. The wash fluid according to claim 1, wherein
    the basic inorganic compound includes at least one of sodium hydroxide and potassium hydroxide.

6. An image formation method comprising:
    ejecting an ink toward a recording medium from an ejection surface of a recording head;
    supplying a wash fluid to the ejection surface;
    discharging the ink from the ejection surface by pressure application; and
    wiping the ejection surface, wherein
    the wash fluid is the wash fluid according to claim 1.

7. The wash fluid according to claim 1, wherein
    the basic inorganic compound is contained in the wash fluid in an amount of at least 0.0001 mol/L and no greater than 0.015 mol/L.

* * * * *